United States Patent Office  3,178,298
Patented Apr. 13, 1965

3,178,298
LOW-IRON, SPALLING RESISTANT PERICLASE BRICK
James W. Craig, Montreal, Quebec, Canada, assignor to Harbison-Walker Refractories Company, Pittsburgh, Pa., a corporation of Pennsylvania
No Drawing. Filed Oct. 18, 1962, Ser. No. 231,591
8 Claims. (Cl. 106—58)

This invention relates to a low-iron periclase brick, made spalling-resistant by the inclusion of relatively coarse particles of magnesium silicate minerals. This application is a continuation-in-part of application Serial Number 843,632, filed October 1, 1959 (now abandoned).

Refractory brick containing a large proportion of dead-burned magnesia (periclase) are used in many high temperature industrial processes, which involve (1) the exposure of the brick-work to hot and sometimes molten slags and dust, (2) large structural stresses, and (3) high temperatures and very often, rapid variation of temperatures and atmospheres. The art of basic refractories is advanced enough to enable one to choose particular compositions of refractory brick with adequate corrosion resistance, abrasion resistance, strength when hot and refractoriness suitable for each process so that the life of a basic refractory brick in many applications is determined by its ability to survive rapid variations in temperature, that is, its capacity to resist thermal spalling. This property of the brick is thus of major concern to the refractory user. Periclase brick have heretofore been considered so prone to spalling that in many cases their use has been avoided even though their chemical properties were ideally suited to the process in hand. Such is the case, for example, in brick for open hearth steel and electric steel furnaces.

A means of overcoming the poor spalling resistance of magnesia brick would allow their superior chemical properties to be utilized to the full, producing a concomitant advance in ceramic and metallurgical technology. In the past, of course, a degree of spalling resistance has been secured by the inclusion of chrome ore, but at the expense of certain desirable properties. The inclusion of chrome ore in a brick decreases its resistance to stresses due to fluctuations between oxidizing and reducing conditions; such resistance is determined mainly by the amount and type of iron compounds present in the brick. It is known that changes in the oxidation state of the iron can occur at temperatures and oxygen pressures encountered in steel-making furnaces, and such changes produce structural changes in the brick. These changes frequently produce an irreversible expansion or "growth" of the brick, and this growth can make the brick so weak that it will completely disintegrate. Moreover, iron compounds will migrate from the chrome grains, destroying the discontinuous structure believed to be necessary to spalling resistance, and in addition producing fluxes which alter the brick structure, decreasing its resilience and promoting spalling.

Another serious disadvantage of chrome ore is that the most suitable types for brickmaking are not found in America, and world reserves are dwindling. Furthermore, there are instances of metallurgical processes in which even the small amount of chrome contamination caused by the use of magnesia-chrome bricks cannot be tolerated, yet the chemical properties and spalling resistance are both required.

Other attempts at making spalling-resistant periclase brick have used, as their basis, the addition of various finely ground ceramic materials to form, on firing, bonds modifying the physical characteristics of the brick. Although these additions have been claimed to produce an increase in the spalling resistance of periclase brick, such brick have not replaced magnesia-chrome brick commercially.

It is an object of this invention to provide a periclase brick having a greatly increased spalling resistance while possessing fully adequate slag resistance, insensitivity to atmosphere changes and refractoriness.

The invention resides in a refractory brick of low iron oxide content and high thermal spalling resistance consisting essentially of 70 to 97% by weight of a substantially iron-free periclase matrix containing at least 90% by weight of magnesia, not more than 6% by weight of silica and not substantially more than 2% by weight of any other oxide, and, dispersed and embedded in said matrix, from 3 to 30% by weight of a magnesium silicate containing not more than 15% of iron oxide calculated as $Fe_2O_3$ and chosen from the group consisting of serpentine and magnesium orthosilicates, said magnesium silicate having a particle size substantially within the range minus 3 plus 28 mesh, said brick having a maximum particle size not substantially greater than minus 3 mesh, containing substantially 45–75% by weight of plus 28 mesh particles in which the weight ratio of plus 10 mesh to minus 10 plus 28 mesh particles lies between 0.66 and 1.33 and at least 20% by weight of particles finer than 65 mesh, and containing not substantially more than 3% of iron oxide calculated as $Fe_2O_3$.

The natural and artificial magnesium silicates useful in accordance with this invention in producing the desired spalling resistance include (1) serpentine $$(3MgO.2SiO_2.2H_2O)$$

both as found in nature and calcined to drive off water, (2) magnesium orthosilicates such as forsterite $$(2MgO.SiO_2)$$

natural or artificial, and (3) magnesian olivine $$(2(MgO.FeO).SiO_2)$$

provided that the iron oxide content of the three materials calculated as $Fe_2O_3$ is below about 15 and preferably below 12%. Because of their lower refractoriness, magnesium metasilicates, e.g., pyroxenes, are unsuitable.

Periclase used in making the brick should preferably be substantially iron-free, but some can be tolerated without complete loss of the advantages of the invention provided that the overall iron oxide content of the brick (calculated as $Fe_2O_3$) be not substantially over 3.0%. The lower the iron oxide content of the magnesium silicate component the better; superior results are obtained when the iron oxide content is not more than 3%. Furthermore, the periclase must contain at least 90% MgO, not more than 6% $SiO_2$ and not substantially more than 2% of any other oxide.

The proportions of magnesium silicate in the brick can be varied from substantially 3 to 30%, the precise amount depending on the quantity of iron oxide in the constituents and the degree of spalling resistance required. At the lower part of this range, the spalling resistance of the brick is marginal for some applications, and at the higher part the addition of more magnesium silicate produces proportionately less increase in the spalling resistance. The preferred range of magnesium silicate normally is from 5 to 15%.

The grain size of the magnesium silicate is extremely important in producing the desired spalling resistance. The preferred grain size of the magnesium silicate is substantially minus 4 plus 14 mesh (Tyler standard screen scale) and the practical limits of the size of the magnesium silicate are minus 3 plus 28 mesh. When magnesium silicate coarser than 3 mesh is used, brick-making difficulties are experienced, and when finer than 28 mesh the magnesium silicate loses its effectiveness in producing the advantageous results of this invention. The over-all sizing of the combined constituents must also be controlled closely, in order to produce a satisfactory brick; such proportioning is well known in the art.

Conventional brick making compositions contain coarse, intermediate and fine fractions in selected proportions. They may not contain too high a proportion of coarse particles or the brick will not hold together, nor too high a proportion of fine particles or the brick will laminate under normal forming pressures. Restrictions must also be placed on the size of the coarsest particles. In practice, the size of the coarsest particle is not greater than 3 mesh. Often, however, for practical reasons, the top size is limited to 4 mesh or 6 mesh and even, in some specific applications, to 10 mesh. In the latter case, the additive would preferably be limited to a top grain size of 10 mesh, although it is, of course, not essential that the top sizes of the periclase and additive be the same.

Moreover, in general, these brick making compositions contain 45–75% by weight of plus 28 mesh particles in which the weight ratio of plus 10 mesh particles to minus 10 plus 28 mesh particles lies between 0.66 and 1.33 and at least 20% of particles finer than 65 mesh.

The product of the invention is thus a refractory periclase brick having dispersed and embedded in it discrete particles of magnesium silicate. The brick of the invention thus has the desirable properties of a periclase brick; that is to say, its volume stability, slag resistance and refractoriness under load are essentially the same as those of periclase brick; its density is slightly less because of the inherently lower density of magnesium silicates compared to that of periclase. The magnesia content is, of course, lower than that of a periclase brick, but is much higher than that of a magnesia chrome brick of equal spalling resistance. The strength, too, is lower and is of about the same order as that of magnesia-chrome brick; it is thus adequate for service requirements and well above that needed for withstanding damage during shipping and handling.

The superior spalling resistance of the brick of the invention has been established both in practice and by the use of a test developed in Canada, which is considered very satisfactory for brick of high spalling resistance. It consists in subjecting the end face of a brick alternately to (1) radiation from a furnace wall at 1100° C. and at a distance of 2 inches for 45 minutes, and (2) a blast of air at room temperature for 15 minutes. This cycle is repeated until either the end of the brick breaks off or it remains whole after 10 cycles, when it is assessed visually as to the severity of the damage incurred in the test. Ten cycles is the normal duration of the test, since it has been found that this represents adequate spalling resistance for most service conditions; the test can be carried further to differentiate between two brick of extremely high spalling resistance, but this is not normally done. Brick which have spalled are rated from 1 to 10 according to the number of the cycle in which failure has occurred. Brick which have successfully passed the test are differentiated as follows:

Large cracks but end adhering _____ 10+
Many small cracks _____ 10++
One or several short, hairline cracks _____ 10+++
Intact, apparently unaffected _____ 10++++

Heretofore known periclase brick subjected to this test have on the average spalled at 3 to 4 cycles.

| Percent periclase | Magnesium silicate | | Spalling resistance | | | | |
|---|---|---|---|---|---|---|---|
| | Percent | Type | No additive | −4+14M | −6+28M | −14+28M | −100M |
| 100 | 0 | | 3(3), 4(2) Unsatisfactory. | | | | |
| 90 | 10 | Olivine (North Carolina) 11.3% Fe$_2$O$_3$, 48% MgO. | | | 10, 10+++(4), 10++++. | 6(2), 10, 10+, 10++. | 2(2), 4(4) unsatisfactory. |
| 80 | 20 | ___do___ | | | 10+++(5), 10++++. | | |
| 70 | 30 | ___do___ | | | 6,10,10+,(2), 10++,10+++. | | |
| 90 | 10 | Raw serpentine (Kilmar, P.Q.). | | | 3,6,10,10+(2) 10++. | | |
| 90 | 10 | Calcined serpentine (Kilmar, P.Q.) 1.0% Fe$_2$O$_3$, 50% MgO. | | | 2,5(2),10+ 10++,10+++. | | |
| 95 | 5 | Calcined serpentine (Unst, Scotland) 13.6% Fe$_2$O$_3$, 45% MgO. | | 9,10+,10++, 10++++(2). | | | |
| 90 | 10 | ___do___ | | 10+(6) | 4(2),5(2),10, 10++. | 2,3,5,10+(2), 10+++. | 1(2),2(3) unsatisfactory. |
| 90 | 10 | Manufactured forsterite grog 10.7% Fe$_2$O$_3$, 56% MgO. | | 7,10+(3),10++ | | | |

The determined numerical rating of each brick is quoted. Numbers in brackets show the number of replicate tests giving the preceding result.

In Table 1, the spalling resistance of the brick of this invention as determined by the above test is compared with the spalling resistance of various other types of brick. All brick listed in the table were made by a normal commercial method for making periclase brick, using a periclase having substantially the following composition: 4.4% SiO$_2$, 2.0% CaO, 0.9% Fe$_2$O$_3$, 1.0% Al$_2$O$_3$ and 91.7% MgO. The magnesium silicates used in these examples have been chosen from those available commercially in large quantities; adequate supplies of some are available in both the United States and Canada, and are cheaper than chrome ore.

The invention is applicable to both burned and unburned brick.

The screen sizes as set forth in the foregoing specification and in the appended claims are Tyler standard.

The embodiments of the invention in which an exclusive property or privilege is claimed are defined as follows:

1. A refractory brick of low iron oxide content and high thermal spalling resistance consisting essentially of 70 to 97% by weight of a substantially iron-free periclase matrix containing at least 90% by weight of magnesia, not more than 6% by weight of silica and not substantially more than 2% by weight of any other oxide, and, dispersed and embedded in said matrix, from 3 to 30% by weight of discrete particles of a magnesium silicate containing not more than 15% of iron oxide calculated as Fe$_2$O$_3$ and chosen from the group consisting of serpentine, magnesian olivine and magnesium orthosilicates, said magnesium silicate having a particle size substantially within the range minus 3 plus 28 mesh, said brick having a maximum particle size not substantially greater than 3 mesh, containing substantially 45–75% by weight of plus 28 mesh particles in which the weight ratio of plus 10 mesh to minus 10 plus 28 mesh particles lies between 0.66 and 1.33 and at least 20% by weight of particles finer than 65 mesh, and containing not substantially more than 3% of iron oxide calculated as Fe$_2$O$_3$.

2. A refractory brick according to claim 1 in which the amount of magnesium silicate is between 5 and 15% by weight.

3. A refractory brick according to claim 1 in which the particle size of the magnesium silicate is minus 4 plus 14 mesh.

4. A refractory brick according to claim 1 in which the magnesium silicate is a magnesium orthosilicate containing not more than 12% iron oxide calculated as $Fe_2O_3$.

5. A refractory brick according to claim 1 in which the magnesium silicate is serpentine, analysing less than 3.0% $Fe_2O_3$ on a loss-free basis.

6. A refractory brick brick as defined in claim 1 in which the magnesium silicate is magnesian olivine in the proportion of 5 to 15% by weight.

7. A refractory brick as defined in claim 1 wherein the magnesium silicate is forsterite containing less than 3.0% of iron oxide.

8. In a basic brick fabricated from 70 to 97% by weight of a substantially iron-free periclase and having a maximum particle size not substantially greater than minus 3 mesh, containing substantially 45–75% by weight of plus 28 mesh particles in which the weight ratio of plus 10 mesh to minus 10 plus 28 mesh particles lies between 0.66 and 1.33 and at least 20% by weight of particles finer than 65 mesh, and containing not substantially more than 3% of iron oxide calculated as $Fe_2O_3$, the improvement which comprises 3 to 30% by weight of discrete particles of a magnesium silicate dispersed throughout said brick, said magnesium silicate containing not more than 15% of iron oxide calculated as $Fe_2O_3$ and chosen from the group consisting of serpentine and magnesium orthosilicates, said magnesium silicate having a particle size substantially within the range minus 3 plus 28 mesh, said brick containing not substantially more than 3% of iron oxide calculated as $Fe_2O_3$.

References Cited by the Examiner
UNITED STATES PATENTS

| | | | |
|---|---|---|---|
| 2,433,415 | 12/47 | Austin | 106—60 |
| 2,695,242 | 11/54 | Woodward | 106—58 |

TOBIAS E. LEVOW, *Primary Examiner.*